United States Patent [19]

Iwata

[11] Patent Number: 5,134,643
[45] Date of Patent: Jul. 28, 1992

[54] METHOD AND SYSTEM FOR TESTING MOBILE COMMUNICATION SYSTEMS

[75] Inventor: Kiyoshi Iwata, Kawasaki, Japan

[73] Assignee: Fujitsu Limited, Kawasaki, Japan

[21] Appl. No.: 585,516

[22] Filed: Sep. 20, 1990

[30] Foreign Application Priority Data

Sep. 20, 1989 [JP] Japan .................. 1-243762

[51] Int. Cl.⁵ .............................. H04M 1/24
[52] U.S. Cl. ........................ 379/23; 379/26; 379/27; 379/63
[58] Field of Search .......... 379/27, 22, 23, 26, 379/63

[56] References Cited

U.S. PATENT DOCUMENTS 4,424,421  1/1984  Townsend et al. .................. 379/27

*Primary Examiner*—Stafford D. Schreyer
*Attorney, Agent, or Firm*—Staas & Halsey

[57] ABSTRACT

A method and system for testing a mobile communication system which includes a base station radio unit for making a line connection with an arbitrary one of a plurality of mobile stations, a line control unit which is coupled to the base station radio unit, and a pseudo mobile station which is coupled to the line control unit via a monitoring control line. The method includes the steps of transmitting a line test instruction from the line control unit to the pseudo mobile station via the monitoring control line, detecting whether or not the pseudo mobile station periodically receives the line test instruction from the line control unit via the monitoring control line, making a line test using pseudo station identifying information which is assigned to the pseudo mobile station and is peculiar thereto when no line test instruction is periodically received by the pseudo mobile station, and detecting an abnormality in the monitoring control line based on the pseudo station identifying information which is received by the line control unit via the base station radio unit.

18 Claims, 6 Drawing Sheets

FIG. I PRIOR ART

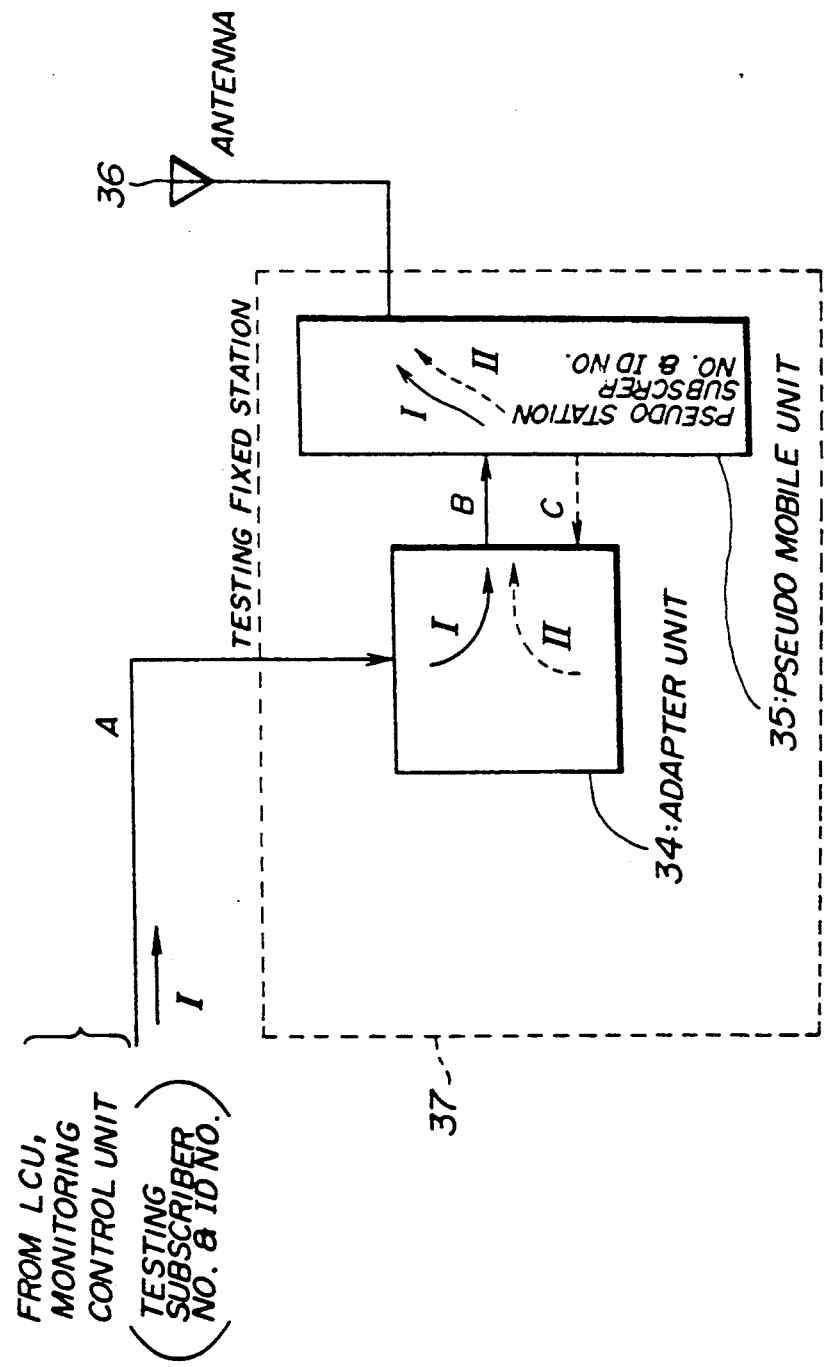

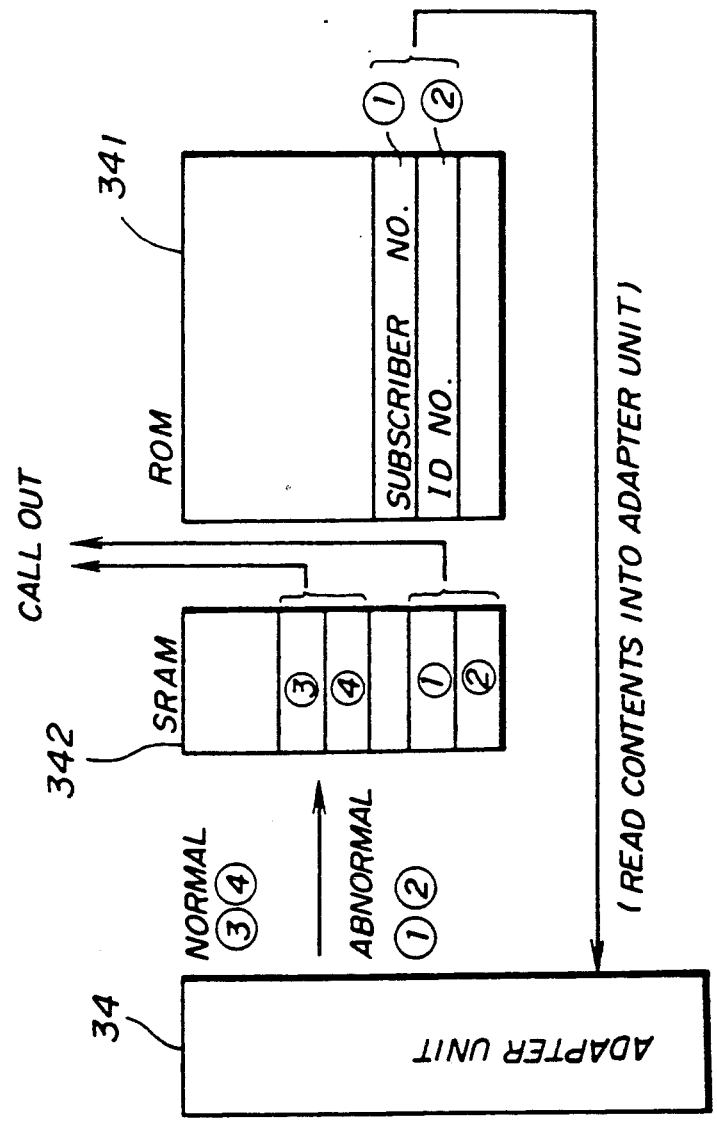

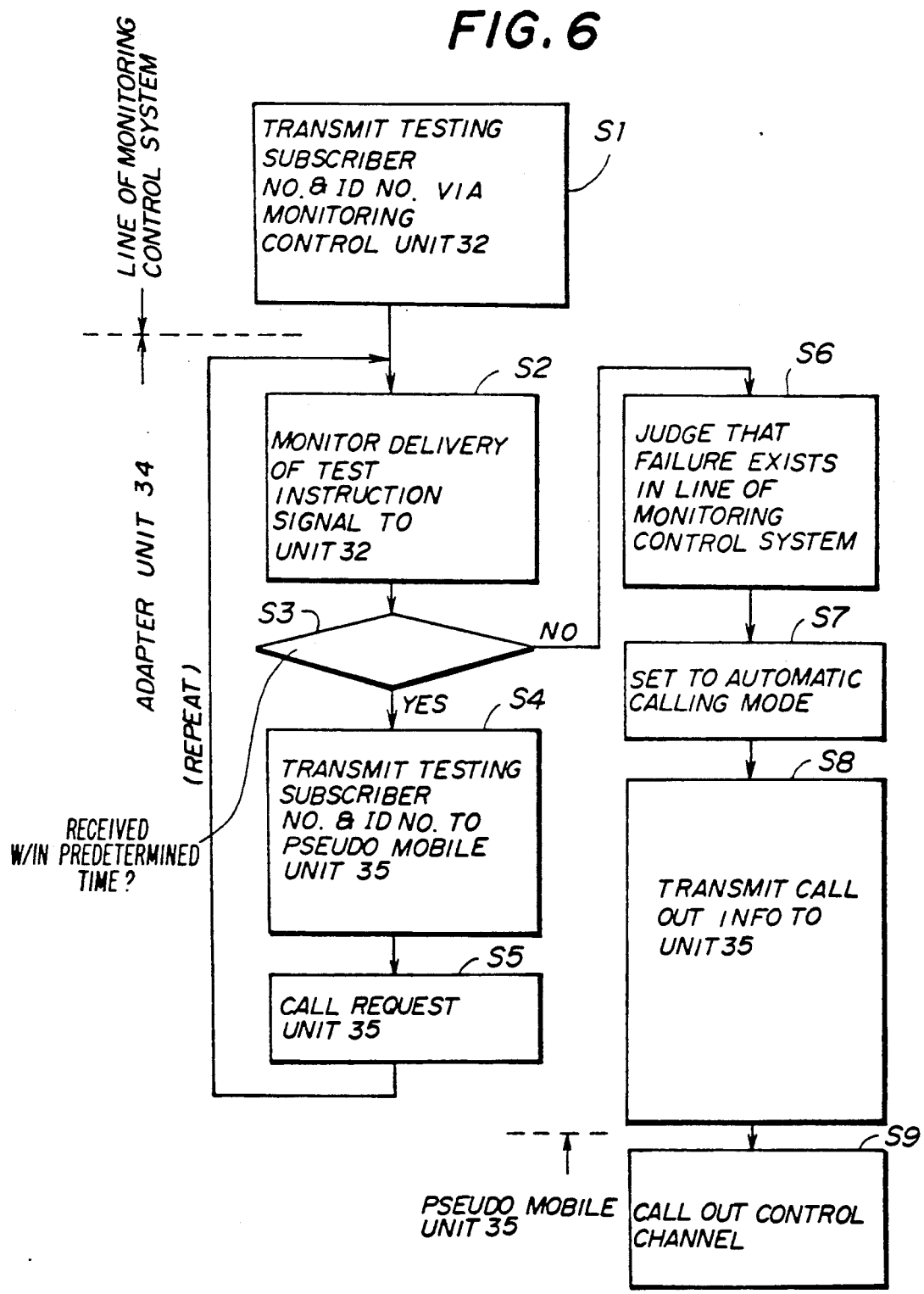

METHOD AND SYSTEM FOR TESTING MOBILE COMMUNICATION SYSTEMS

BACKGROUND OF THE INVENTION

The present invention generally relates to methods and systems for testing mobile communication systems, and more particularly to a method and a system for testing a mobile communication system such as a portable mobile radiotelephone (hereinafter simply referred to as radiophone) and an automobile telephone (hereinafter simply referred to as a carphone). The method and system according to the present invention is used for detecting a line abnormality in a monitoring control line between a line control station and a pseudo (or simulating) mobile station which is used for line testing.

In a mobile communication system, a test is made to determine whether or not a line connection is correctly carried out between a radio base station and a mobile station. When making the test, a line test instruction is sent from a line control station to a pseudo (or simulating) mobile station which is set up in the radio base station via a monitoring control line. A check is made to determine whether or not the pseudo mobile station correctly carries out a line connection responsive to the line test instruction. In this case, when an abnormality exists in the monitoring control line, the above described test cannot be made. For this reason, it is also necessary to monitor whether or not an abnormality exists in the monitoring control line. Of course, the line test instruction may be sent from the pseudo mobile station to the line control station so as to carry out a similar test.

FIG.1 shows an example of a conventional portable mobile radiotelephone system. This portable mobile radiotelephone system includes a public line network 1, a central control station 2, a radio base station 3 and mobile stations 4. The public line network 1 connects a general subscriber to the central control station 2 via a public line switching system 11. The central control station 2 includes a line switching part 21, a line control unit 22, a customer control and accounting system 23, a monitoring control unit 24 and the like. The radio base station 3 includes a radio unit 31, a monitoring control unit 32, a testing fixed station 33 and the like. The testing fixed station 33 has the same calling means as the mobile stations 4. The monitoring control unit 24 of the central control station 2 and the monitoring control unit 32 of the radio base station 3 are connected by a monitoring control line 61. Hence, test instruction information which is used for testing a message line (a line of a radio system) can be transmitted from the line control unit 22 to the testing fixed station 33.

In the portable mobile radiophone system shown in FIG.1, it is necessary to periodically monitor whether or not a message line between the general subscriber and the mobile station 4 is normal by carrying out a test. This test is carried out in the following manner.

First, in the central control station 2, a testing subscriber number and identification (ID) number are input and set from a console (not shown) of the line control unit 22. The line control unit 22 successively transmits together with a test instruction signal the testing subscriber number and ID number to the testing fixed station 33 via the monitoring control unit 24, the monitoring control line 61 and the monitoring control unit 32. Each mobile station 4 has an independent subscriber number and ID number assigned thereto which are different from those assigned to other mobile stations 4. The testing subscriber number and ID number are set different from those already assigned to the mobile stations 4.

The testing fixed station 33 uses the testing subscriber number and ID number, which are received via the monitoring control line, to call out a control channel of a radio line between the testing fixed station 33 and the radio unit 31. Hence, a line is connected between the testing fixed station 33 and the line control unit 22. When the call out of the control channel is received, the radio unit 31 informs the line control unit 22 that the call out is received. The line control unit 22 detects the testing subscriber number and ID number which are set from the call information. It is possible to detect whether or not the control channel is functioning correctly and to confirm whether or not a line is connected between the line control unit 22 and the testing fixed station 33 based on the detected testing subscriber number and ID number.

The call out of the control channel from the testing fixed station 33 is made periodically. As a result, the abnormal/normal state of the line between the mobile station 4 and the line control unit 22 is monitored periodically.

In the conventional mobile communication system such as the portable mobile radiophone system described above, the line control unit 22 transmits the test instruction information to testing fixed station 33 via the monitoring control line 61. For this reason, when a fault such as a disconnection of the line of the monitoring control system occurs, it no longer becomes possible to make the periodic call out from the testing fixed station 33 to the control channel. There is a problem in that it becomes impossible to carry out a monitoring such as detecting a fault in the message line.

SUMMARY OF THE INVENTION

Accordingly, it is a general object of the present invention to provide a novel and useful method and system for testing a mobile communication system, in which the problems described above are eliminated.

Another and more specific object of the present invention is to provide a method of testing a mobile communication system which includes a base station radio unit for making a line connection with an arbitrary one of the mobile stations, a line control unit which is coupled to the base station radio unit, and a pseudo mobile station which is coupled to the line control unit via a monitoring control line, the method comprising the steps of transmitting a line test instruction from the line control unit to the pseudo mobile station via the monitoring control line, detecting whether or not the pseudo mobile station periodically receives the line test instruction from the line control unit via the monitoring control line, making a line test using a pseudo station identifying information which is assigned to the pseudo mobile station and is peculiar thereto when no line test instruction is periodically received by the pseudo mobile station, and detecting an abnormality in the monitoring control line based on the pseudo station identifying information which is received by the line control unit via the base station radio unit. According to the method of the present invention, it is possible to detect an abnormality in the monitoring control line between the line control unit and the pseudo mobile station. In addition, even when the abnormality exists in the monitoring control line, it is possible to monitor the state of a control channel and a message line by making an automatic calling from the pseudo mobile station. Therefore, the reliability of the test for detecting a line failure in the mobile communication is improved.

Still another object of the present invention is to provide a system for testing a mobile communication system comprising a base station radio unit for making a line connection with an arbitrary one of the mobile stations, a line control unit which is coupled to the base station radio unit, a monitoring control line, and a pseudo mobile station which is coupled to the line control unit via the monitoring control line, where the line control unit transmits a line test instruction to the pseudo mobile station via the monitoring control line, the pseudo mobile station includes first means for detecting whether or not the pseudo mobile station periodically receives the line test instruction from the line control unit via the monitoring control line, and second means for making a line test using a pseudo station identifying information which is assigned to the pseudo mobile station and is peculiar thereto when no line test instruction is periodically received by the pseudo mobile station, and the line control unit includes third means for detecting an abnormality in the monitoring control line based on the pseudo station identifying information which is received via the base station radio unit. According to the system of the present invention, it is possible to detect an abnormality in the monitoring control line between the line control unit and the pseudo mobile station. In addition, even when the abnormality exists in the monitoring control line, it is possible to monitor the state of a control channel and a message line by making an automatic calling from the pseudo mobile station. Therefore, the reliability of the test for detecting a line failure in the mobile communication is improved.

Other objects and further features of the present invention will be apparent from the following detailed description when read in conjunction with the accompanying drawings.

BRIEF DESCRIPTION OF THE DRAWINGS

FIG.4 is a diagram for explaining a signal path within an adapter unit shown in FIG.3;

FIG.5 is a diagram for explaining a memory table of a pseudo mobile unit shown in FIG.3; and FIG.6 is a flow chart for explaining the operation a of the adapter unit shown in FIG.3.

DESCRIPTION OF THE PREFERRED EMBODIMENTS

Figure 2:
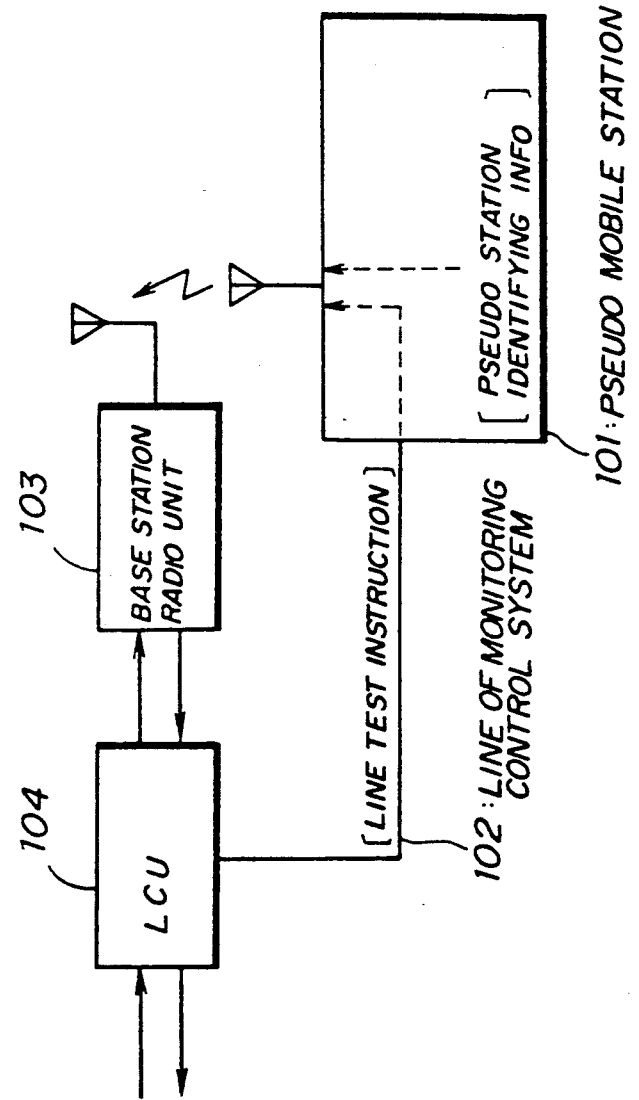
FIG. 2 is a system block diagram for explaining an operating principle of a method and a system for testing a mobile communication system according to the present invention.

First, a description will be given of an operating principle of a method and a system for testing a mobile communication system according to the present invention, by referring to FIG.2.

The present invention is applied to a mobile communication system which includes a pseudo mobile station 101 for testing lines. Pseudo station identifying information peculiar to the pseudo mobile station 101 is assigned to the pseudo mobile station 101. When the pseudo mobile station 101 detects that a line testing instruction is not received periodically from a line control unit 104 via a monitoring control line 102, the pseudo mobile station 101 tests the line using the pseudo station identifying information. The line control unit 104 detects a line abnormality in the monitoring control line 102 by receiving the pseudo station identifying information via a base station radio unit 103.

Normally, the line control unit 104 periodically transmits the line test instruction to the pseudo mobile station 101, and the pseudo mobile station 101 tests the line connection using the station identifying information from the line control unit 104. The line control unit 104 judges whether the line connection is normal or abnormal depending on whether or not the station identifying information is received.

When a fault is generated in the monitoring line 102 and the line control unit 104 can no longer periodically transmit the test instruction to the pseudo mobile station 101, the pseudo mobile station 101 detects this state and carries out the test of the line connection by automatically making a call out using the pseudo station identifying information peculiar to the pseudo mobile station 101. The line control unit 104 receives the pseudo station identifying information via the connected line and detects that an abnormality is generated in the monitoring control line 102.

Figure 1:
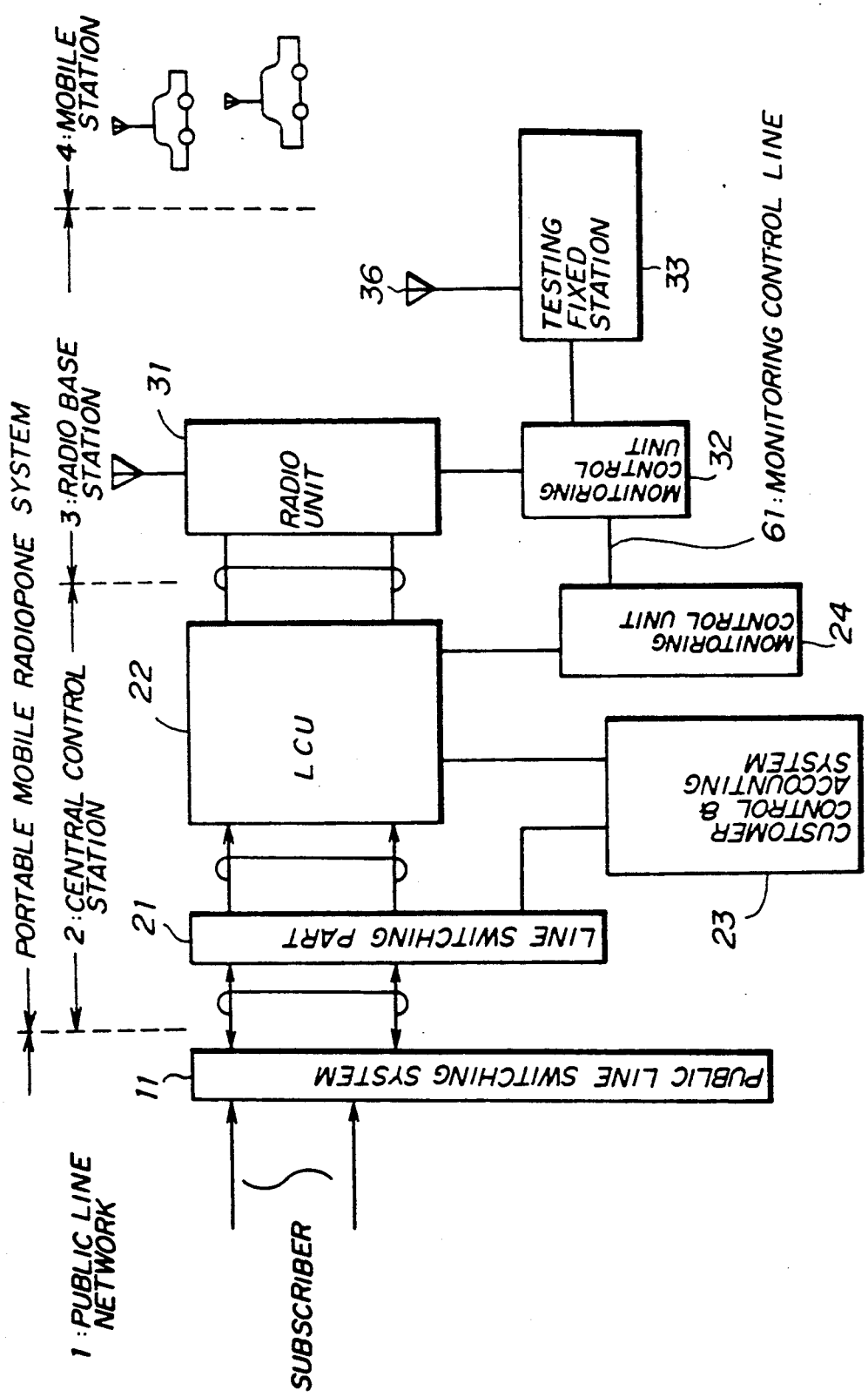
FIG. 1 is a system block diagram of an example of a conventional portable mobile radiophone system.
Figure 3:
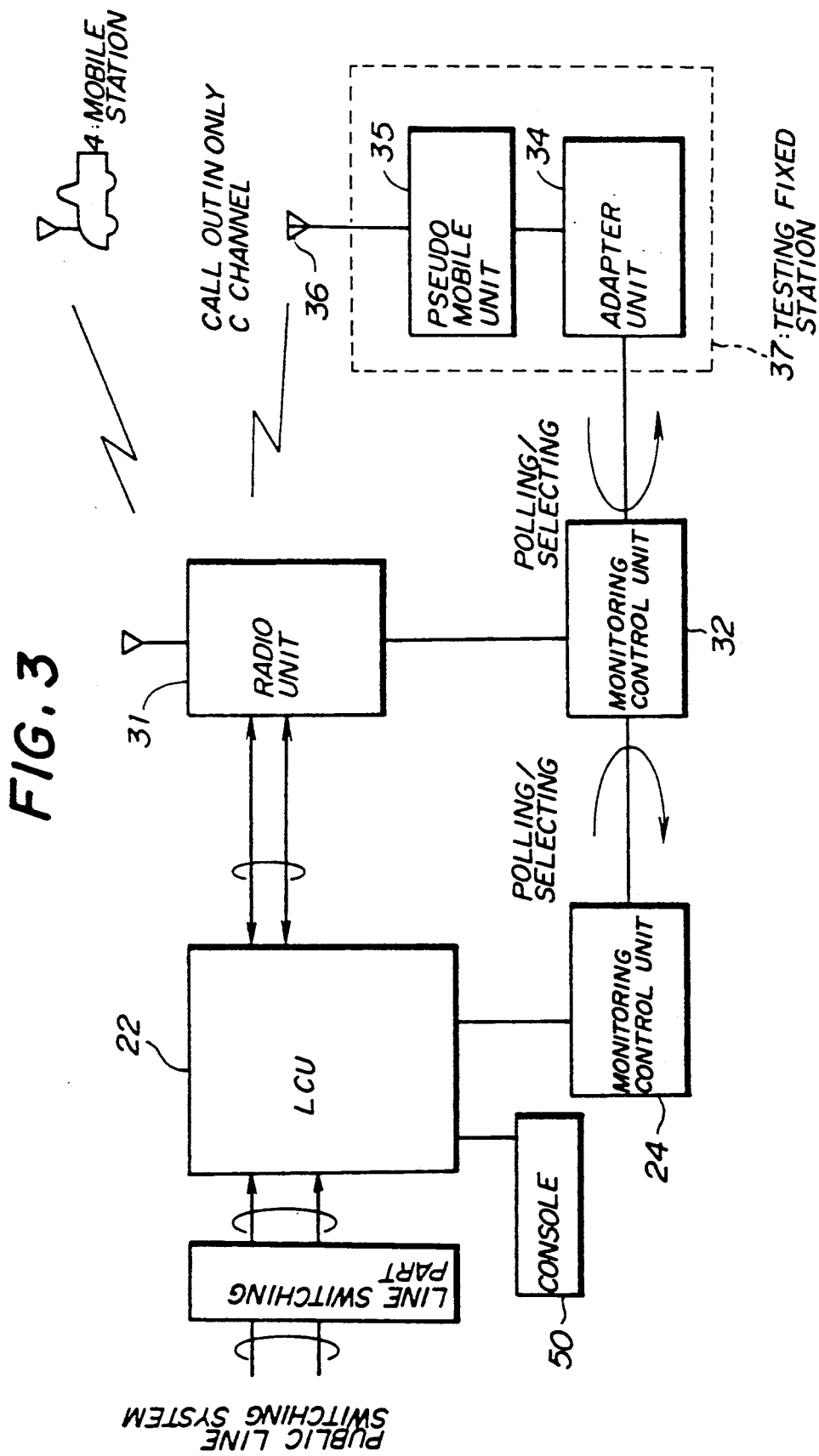
FIG.3 is a system block diagram of an embodiment of the system for testing a mobile communication system according to the present invention.

Next, a description will be given of an embodiment of the system for testing a mobile communication system according to the present invention, by referring to FIG.3. In this embodiment, the system according to the present invention employs an embodiment of the method of testing a mobile communication system according to the present invention. In addition, in this embodiment of the system, the present invention is applied to a portable mobile radiophone system. In FIG.3, those parts which are basically the same as those corresponding parts in FIG.1 are designated by the same reference numerals, and a description thereof will be omitted.

In this embodiment, a testing fixed station 37 is provided with an adapter unit 34, a pseudo mobile unit 35 and an antenna 36. Pseudo station subscriber number and ID number peculiar to the pseudo mobile unit 35 are assigned to the pseudo mobile unit 35, and the pseudo station subscriber number and ID number are stored in a read only memory (ROM) 341 shown in FIG.5 which is provided in the pseudo mobile unit 35. FIG.5 shows a memory table of the pseudo mobile unit 35. The pseudo station subscriber number and ID number can be read out from the ROM 341 of the pseudo mobile unit 35 by the adapter unit 34. The pseudo mobile unit 35 is also provided with a static random access memory (SRAM) 342 shown in FIG.5. In FIG.5, ① and ② denote the pseudo station subscriber number and ID number peculiar to the pseudo mobile unit 35, and ③ and ④ denote testing subscriber number and ID number set from the line control unit 22.

Next, a description will be given of an operation of this embodiment. FIG.4 shows a signal path within the adapter unit 34. FIG.6 shows a flow chart for explaining a procedure of the adapter unit 34.

First, a description will be given of the operation of the embodiment in a normal state. The line control unit 22 instructs the testing fixed station 37 to call out the control channel for testing for a predetermined period and monitors whether or not the line function is normal. When making the call out of the control channel, the testing subscriber number and ID number are input and set from a console 50 of the line control unit 22 shown in FIG.3. The testing subscriber number and ID number are supplied to the testing fixed station 37 together with the test instruction signal as described above in conjunction with FIG.1. The testing subscriber number, ID number and the test instruction signal are first transmitted by polling/selecting via the monitoring control unit 24 of the central control station 2 to the monitoring control unit 32 of the radio base station 3 in a step S1 shown in FIG.6. The adapter unit 34 of the testing fixed station 37 monitors the delivery of the test instruction information to the monitoring control unit 32 for a predetermined period by polling/selecting in a step S2. The adapter unit 34 receives the contents of the test instruction information when the test instruction information is input to the monitoring control unit 32.

Accordingly, the adapter unit 34 determines whether or not the monitoring control unit 32 periodically receives the test instruction information in step S3, that is, receives the test instruction information within a predetermined time. When the judgement result in the step S3 is YES, the adapter unit 34 transmits the testing subscriber number and ID number included in the test instruction information to the pseudo mobile unit 35 in a step S4. In addition, the adapter unit 34 makes a call request to the pseudo mobile unit 35 in a step S5. The signal path within the testing fixed station 33 in this case becomes as shown by a path A-I-B-I in FIG.4. Hence, the pseudo mobile unit 35 calls out the control channel using the testing subscriber number and ID number, and a message line is established between the testing fixed station 33 and the line control unit 22.

The line control unit 22 determines that both the control channel and the monitoring control unit 32 are normal when an answer which includes the testing subscriber number and ID number identical to those set from the console 50 of the line control unit 22 is returned from the testing fixed station 33 via the message line.

On the other hand, when the monitoring control line is disconnected, for example, the testing fixed station 33 can no longer receive the test instruction information from the line control unit 22 for the predetermined period. In this case, the adapter unit 34 does not receive the test instruction information within the predetermined time and the result in the step S3 becomes NO. The adapter unit 34 determines that a failure has occurred in the monitoring control line in a step S6. Hence, the adapter unit 34 sets the operation mode to an automatic calling mode in a step S7.

In the automatic calling mode, the adapter unit 34 reads out from the pseudo mobile unit 35 the pseudo station subscriber number and ID number peculiar to the pseudo mobile unit 35 and transmits the same to the pseudo mobile unit 35 as call out information in a step S8. Responsive to the call out information from the adapter unit 34, the pseudo mobile unit 35 outputs a call request so as to call out the control channel with the predetermined period in a step S9. This call out is made during the predetermined period until the monitoring control line recovers. The signal path within the testing fixed station 33 in this case becomes as shown by a path C-II-B-II in FIG.4. Hence, a line is established between the testing fixed station 33 and the line control unit 22.

In place of the testing subscriber number and ID number set from the console 50 of the line control unit 22, the line control unit 22 receives the pseudo subscriber number and ID number peculiar to the testing fixed station 33. For this reason, it is possible to detect that the test instruction signal transmitted from the line control unit 22 is not delivered to the testing fixed station 33. The is, that an abnormality is generated in the monitoring control line.

In the described embodiment, the present invention is applied to a portable mobile radiophone system. However, the present invention can be applied to any mobile communication systems such as a carphone system.

Further, the present invention is not limited to these embodiments, but various variations and modifications may be made without departing from the scope of the present invention.

What is claimed is:

1. A method of testing a mobile communication system which includes a base station radio unit for making a line connection with an arbitrary one of mobile stations, a line control unit which is coupled to the base station radio unit, and a pseudo mobile station which is coupled to the line control unit via a monitoring control line, said method comprising the steps of:
   a) transmitting a line test instruction from the line control unit to the pseudo mobile station via the monitoring control line;
   b) detecting whether the pseudo mobile station periodically receives the line test instruction from the line control unit via the monitoring control line;
   c) making a line test using pseudo station identifying information which is assigned to the pseudo mobile station and is peculiar thereto when no line test instruction is periodically received by the pseudo mobile station; and
   d) detecting an abnormality in the monitoring control line based on the pseudo station identifying information which is received by the line control unit via the base station radio unit.

2. A method of testing the mobile communication system as claimed in claim 1, wherein said step c) of making the line test includes making an automatic calling using the pseudo station identifying information.

3. A method of testing the mobile communication system as claimed in claim 1, wherein the pseudo station identifying information is different from any of the station identifying information assigned to the mobile stations.

4. A method of testing the mobile communication system as claimed in claim 1, wherein the pseudo station identifying information includes a pseudo station subscriber number and identification number.

5. A method of testing the mobile communication system as claimed in claim 1, wherein said step d) of detecting the abnormality includes detecting an abnormality in the monitoring control line when the line control unit receives the pseudo station identifying information from the base station radio unit.

6. A method of testing the mobile communication system as claimed in claim 1, wherein said step a) of transmitting the line test instruction includes transmitting the line test instruction to the pseudo mobile station via a line monitoring control unit inserted in the monitoring control line.

7. A method of testing the mobile communication system as claimed in claim 1, wherein said step a) of transmitting the line test instruction includes transmitting the line test instruction to the pseudo mobile station via a first monitoring control unit which is coupled to the line control unit and is inserted in the monitoring control line and a second monitoring control unit which is coupled to the base station radio unit and is inserted in the monitoring control line.

8. A method of testing the mobile communication system as claimed in claim 7, wherein said step a) of transmitting the line test instruction includes transmitting the line test instruction together with a testing subscriber number and identification number, carrying out a polling/selecting between the first and second monitoring control units and between the second monitoring control unit and the pseudo mobile station.

9. A method of testing the mobile communication system as claimed in claim 1, wherein the mobile stations are selected from a group including a portable mobile radiotelephone and an automobile telephone.

10. A system for testing a mobile communication system including a plurality of mobile stations, comprising:
a base station radio unit for making a line connection with an arbitrary one of mobile stations;
a line control unit which is coupled to said base station radio unit;
a monitoring control line; and
a pseudo mobile station which is coupled to said line control unit via said monitoring control line and outputting pseudo station identifying information, said pseudo mobile station including:
first means for detecting whether said pseudo mobile station periodically receives the line test instruction from said line control unit via said monitoring control line; and
second means for making a line test using the pseudo station identifying information which is assigned to said pseudo mobile station and is peculiar thereto when no line test instruction is periodically received by said pseudo mobile station,
said line control unit transmitting a line test instruction to said pseudo mobile station via said monitoring control line,
said line control unit including third means for detecting an abnormality in said monitoring control line based on said pseudo station identifying information which is received via said base station radio unit.

11. A system for testing the mobile communication system as claimed in claim 10, wherein said second means of said pseudo mobile station makes an automatic calling using said pseudo station identifying information.

12. A system for testing the mobile communication system as claimed in claim 10, wherein said pseudo station identifying information is different from station identifying information assigned to the mobile stations.

13. A system for testing the mobile communication system as claimed in claim 10, wherein said pseudo station identifying information includes a pseudo station subscriber number and an identification number.

14. A system for testing the mobile communication system as claimed in claim 10, wherein said third means of said line control unit detects an abnormality in said monitoring control line when said line control unit receives said pseudo station identifying information from said base station radio unit.

15. A system for testing the mobile communication system as claimed in claim 10, further comprising a monitoring control unit inserted in said monitoring control line, and wherein said line control unit transmits the line test instruction to said pseudo mobile station via said line monitoring control unit.

16. A system for testing the mobile communication system as claimed in claim 10, which further comprises:
a first monitoring control unit coupled to said line control unit and inserted in said monitoring control line; and
a second monitoring control unit coupled to said base station radio unit and inserted in said monitoring control line,
wherein said line control unit transmits the line test instruction to said pseudo mobile station via said first monitoring control unit and said second monitoring control unit.

17. A system for testing the mobile communication system as claimed in claims 16, wherein said line control unit transmits the line test instruction together with a testing subscriber number and an identification number, a polling/selecting being carried out between said first and second monitoring control units and between said second monitoring control unit and said pseudo mobile station.

18. A system for testing the mobile communication system as claimed in claim 10, wherein the mobile stations are selected from a group including a portable mobile radiotelephone and an automobile telephone.

* * * * *